Figure 1:
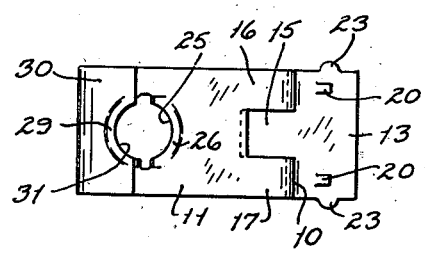

Sept. 11, 1945.　　　G. A. TINNERMAN　　　2,384,508

FASTENING DEVICE

Original Filed Dec. 22, 1938

INVENTOR.

George A. Tinnerman

BY

Bates, Teare & McKee,

Attorneys.

Patented Sept. 11, 1945

2,384,508

UNITED STATES PATENT OFFICE 2,384,508

FASTENING DEVICE

George A. Tinnerman, Cleveland, Ohio, assignor to Tinnerman Products, Inc., Cleveland, Ohio, a corporation of Ohio Original application December 22, 1938, Serial No. 247,158, now Patent No. 2,346,712, dated April 18, 1944. Divided and this application February 3, 1943, Serial No. 474,554. In Canada October 27, 1939

4 Claims. (Cl. 85—32)

The present application is a division of my copending application, Serial No. 247,158, filed December 22, 1938, now Patent 2,346,712 issued April 18, 1944, which is a continuation in part of my Patent No. 2,222,449, issued November 19, 1940.

This invention relates to a sheet metal nut and particularly to one which is adapted to be used in an assembly where it is necessary for the fastener to retain itself in bolt receiving position prior to the insertion of the bolt. The invention is more particularly concerned with an improved self-locking nut having means formed as an integral part thereof to secure the nut to the structure with which it engages.

An important purpose of the present invention is the provision of means formed as an integral part of the nut for securing it to the structure with which it contacts in such manner that it is not only fixedly held in position, but that the perforation in the structure through which the nut attaching means passes is closed or sealed by the securing means. Fasteners for accomplishing this purpose are useful in many installations as for example in the automobile bodies, refrigerator cabinets, railway cars, airplanes, tanks, etc., where the parts are accessible from only one side and wherein there is an opening through which the fastener is partially passed so that the thread carrying portion may lie on the distant or blind side of the support while securing portion of the fastener lies on the front side thereof. A very frequent location for such an assembly is the fender of an automobile body.

One of the features to which the present application is directed is the provision of lateral extensions on the base portion of this integral fastener adapted to remain on the front side of the support and overlap the lateral margins about the opening through which the nut-carrying portion of the integral member is passed. These extensions beyond the side edges of the portion which is inserted in the opening insure against the entire fastener being inadvertently passed through the opening and lost in the interior of the device having the support. Such side extensions act with portions of the fasteners which overlap the longitudinal margins of the opening in the support to effect a very firm locking of the base against the support, effectively closing the opening.

My invention is hereinafter more fully described in connection with the drawing, which discloses several embodiments, all having the features of the base portion overlapping the lateral margins as well as the longitudinal margins of the support about the opening through it.

Figure 2:
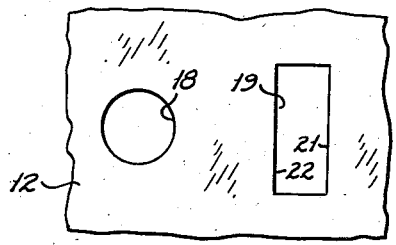
Figure 3:
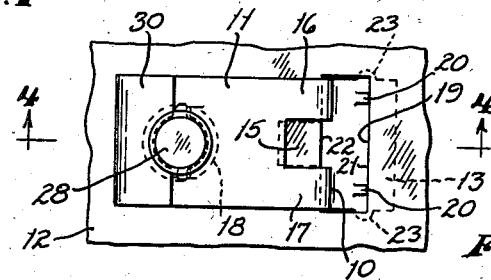
Figure 4:
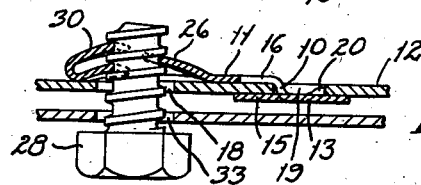
Figure 5:
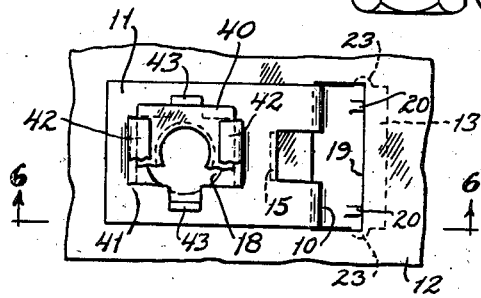
Figure 7:
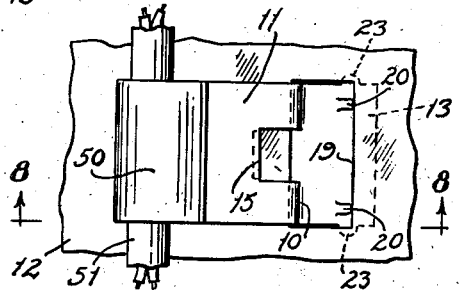
Figure 6:
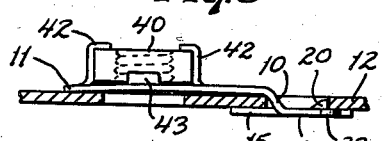
Figure 8:

In the drawing, Fig. 1 is a plan of one form of my fastening device; Fig. 2 is a plan of a portion of a support on which the fastening device may be mounted; Fig. 3 is a plan of the fastening device of Fig. 1 on the support of Fig. 2; Fig. 4 is a cross section on line 4—4 of Fig. 3; Fig. 5 is a plan of another form of my fastening device in place on a support; Fig. 6 is a cross section of the embodiment of Fig. 5 in a plane indicated by the line 6—6; Fig. 7 is a plan of a third embodiment of my fastening device in place on a support; Fig. 8 is a cross section on the line 8—8 on Fig. 7.

Referring to all of the figures, the fastener comprises a strip of sheet metal that is offset intermediate its ends as at 10 to provide a nut-carrying arm 11 that is disposed on one side of a supporting article 12, and to provide another arm 13 that is adapted to engage the opposite side of the article 12. The arms 11 and 13 are disposed in approximately parallel planes.

To hold the fastener securely in place upon an article, I prefer to utilize a tongue 15 which lies substantially in the same plane as the arm 13 and which is formed from the arm 11 by being struck downwardly therefrom. The tongue is spaced from the arm sufficiently far to admit the article 12 and to make a snug fit therewith. The cutting of the arm 11 to make the tongue 15 leaves a U-shaped opening in the arm and provides two connecting parts 16 and 17 adjacent the offset 10.

The article 12 is shown as having a bolt receiving aperture 18 and a fastener receiving aperture 19 therein. The aperture 19 serves as an opening through which the arm 11 may be passed until the tongue 15 engages the under surface of the article. At such time, the aperture is sealed by the arm 13 against the entrance of water or other foreign matter. Then, to lock the fastener in position on the plate, I have shown prongs, projections, or lugs 20 which are preferably struck upwardly from the arm 13 for engagement with the wall 21 of the aperture 19. The offset portion 10 engages the opposite wall 22 wherefor the fastener is securely locked in position on the article 12 with the tongue 15 and part of the arm 13 underlying one surface thereof.

At the two side edges of the arm 13, I provide lateral extensions shown as tabs 23 whereby that arm is rendered wider than the opening 19 so that it is adapted to project across the ends of the opening 19. These tabs provide a protection against the entire fastener being shoved through the opening 19 and lost on the interior of the article furnishing the support. The tabs also cooperate with the fore and aft or longitudinal extensions 13 and 15 to cause the base portion of the fastener to extend beneath each of the four marginal regions of the opening. The effect is to hold the fastener very firmly in place and to close the opening.

To assemble the fastener onto the article, the arm 11 is passed upwardly through the opening 19 and is then tilted until that portion of the article adjacent the wall 22 enters the crotch formed by the tongues 15, 16 and 17, and thereupon the fastener is forced forwardly until the prongs 20 snap into position against the wall 21. At such time, the opening 18 is in registration with the bolt receiving opening 25 in the arm 11.

In mounting the fastener, the extensions 23 enable the fastener to be freely shoved inwardly through the opening 19, at an angle thereto, without danger of the whole fastener passing through the opening because if the tongue 15 passes into the opening the tabs will stop further progress of the fastener through the opening.

The arm 11 is adapted to carry bolt thread engaging means and so I have illustrated various forms for such purpose. In Figs. 1 to 4, the metal in the arm 11 adjacent the bolt opening 25 is formed to engage a thread on a bolt indicated for example at 28. The bolt thread engaging portions may take the form of a split conical protuberance 26 wherein the portion adjacent the wall of the opening 25 is shaped to conform to the helix of the thread on the bolt with which the fastener is intended to be used. Additional engagement of the bolt threads may be made by extending the end of the arm upwardly and inwardly to make an arm 30, the end of which is provided with a notch 31 and is likewise shaped as at 29 to conform to the helix of the bolt thread, but to engage a different turn from that engaged by the portion 26. The fastener has a thickness less than the pitch of the bolt thread and hence the thread engaging portions make contact readily with the bolt in an expeditious manner.

The thread engaging portion operates to lock the bolt thread securely in place and at the same time to permit removal of the bolt in the event that the threads are stripped. In Fig. 4, for example, the shank of the bolt 28 is shown as passing through an aperture 33 in a part being attached and illustrates the bolt in the act of being threaded into engagement with the fastener. The fact that the arm 30 does not completely encircle the bolt shank enables it to be withdrawn whenever desired, without disturbing the part to which the fastener is attached.

In the modification of Figs. 5 and 6, the base portion or arm 13 of the fastener is the same as already described. The thread-carrying portion, however, is different in that the bolt thread engaging means comprises a nut 40 which is suitably threaded to receive the bolt and has its opening in registration with an opening 41 in the arm 11. The opening 41 is the space left in the arm 11 after the partially severed and bent tongues 42 and 43 are formed therefrom. The tongues 42 are flanged at their ends toward each other to overlap the top of the nut 40, while the tongues 43 engage two sides of the nut at right angles to the tongues 42; thus the nut is held effectively in position and against rotation on the arm 11.

The modification of Figs. 7 and 8 illustrates a fastener having the same means for attaching it to a plate after it has been passed through an opening therein, but it differs in that the article receiving portion comprises a loop 50 for receiving an article such as a tube, cable, or similar form indicated in general at 51. The function of the loop is that of exerting a yielding pressure against the article for holding it firmly in place after it has been snapped into position upon the fastener.

From the foregoing description, it will be apparent that a fastener made in accordance with the present invention may be made in a simple manner and may be effectively locked in place against the part with which it is intended to be attached and that it will be effectively held against movement with reference thereto until the bolt is inserted therein.

I claim:

1. A fastener comprising a strip of sheet material offset intermediately to provide two arms, one of the arms carrying means to engage a member to be held in place and the other arm having tabs at its lateral edges, a lug projecting from that face of the last-mentioned arm which is adjacent the plane of the other arm, the arm carrying the lug having also a tongue extending across the plane of the other arm but spaced from it, whereby the second-mentioned arm may overlap four margins of a rectangular opening through which the first-mentioned arm may be passed.

2. A fastener comprising a strip of material intermediately offset to produce two arms in approximately parallel spaced planes, one arm having an opening through it and having portions of the material of the arm adjacent the opening distorted to provide a helical turn to coact with the thread of a bolt, the other arm having a projection thereon adapted to occupy the opening in the support through which the first-mentioned arm may be passed, the arm having the projection being provided with lateral extensions and also with a tongue extending across the plane of the first mentioned arm and spaced therefrom, whereby said second arm may overlap the four margins of a rectangular opening through which the first-mentioned arm may be passed.

3. A single piece fastener made of sheet metal offset intermediately to provide two arms, one arm having an opening through it for the passage of a bolt and carrying thread-engaging means about the opening adapted to coact with the thread of the bolt, an offset portion connecting the first to a second arm, the second arm having tabs at its opposite lateral edges, causing the second arm in the region of the tabs to be wider than the first arm, said second arm being formed with a tongue cut out of the offset portion and a part of the first arm adjacent thereto, said tongue lying in substantially the same plane as the rest of the second arm so that the second arm may overlap four margins of a rectangular opening through which the first-mentioned arm may be passed, and a lug on the second-mentioned arm adapted to occupy such opening and coact with the edge thereof.

4. A fastener comprising a strip of material intermediately offset to produce two arms in approximately parallel spaced planes, one arm having an opening through it and having portions of the material of the arm adjacent the opening bent from the plane of the arm, a separate nut held in registration with the opening by said bent portions, the other arm having a projection thereon adapted to occupy a rectangular opening in a support through which the first-mentioned arm may be passed, the arm having the projection being provided with lateral extensions and also with a tongue extending across the plane of the first-mentioned arm and spaced therefrom, whereby said second arm may overlap the four margins of the rectangular opening.

GEORGE A. TINNERMAN.